(12) United States Patent
Zitting et al.

(10) Patent No.: US 7,604,243 B2
(45) Date of Patent: Oct. 20, 2009

(54) COMPOSITE SEALS, SEAL STRUCTURES AND RELATED METHODS

(75) Inventors: Daniel K. Zitting, St. George, UT (US); Tadd M. McBride, Riverton, UT (US); A. Todd Hagen, Murray, UT (US)

(73) Assignee: Macrotech Polyseal, Inc., Salt Lake City, UT (US)

( * ) Notice: Subject to any disclaimer, the term of this patent is extended or adjusted under 35 U.S.C. 154(b) by 38 days.

(21) Appl. No.: 11/375,688

(22) Filed: Mar. 14, 2006

(65) Prior Publication Data

US 2007/0216108 A1 Sep. 20, 2007

(51) Int. Cl.
*F16J 15/32* (2006.01)
(52) U.S. Cl. ...................... 277/584; 277/589
(58) Field of Classification Search ............... 277/549, 277/551, 584, 589
See application file for complete search history.

(56) References Cited

U.S. PATENT DOCUMENTS

| | | | |
|---|---|---|---|
| 917,690 A | 4/1909 | Weese | |
| 2,665,151 A | 1/1954 | Fisler et al. | |
| 2,934,363 A | 4/1960 | Knox | |
| 3,095,619 A | 7/1963 | Peterson | |
| 3,554,563 A | 1/1971 | Schumacher et al. | |
| 3,833,228 A | 9/1974 | Gilliam, Sr. | |
| 3,848,880 A | 11/1974 | Tanner | |
| 4,040,636 A | 8/1977 | Albertson et al. | |
| 4,090,719 A | 5/1978 | Simanskis et al. | |
| 4,288,082 A | 9/1981 | Setterberg, Jr. | |
| 4,635,945 A * | 1/1987 | Beck | 277/530 |
| 5,879,010 A | 3/1999 | Nilkanth et al. | |
| 6,189,894 B1 * | 2/2001 | Wheeler | 277/549 |
| 6,626,438 B2 * | 9/2003 | Walden | 277/510 |

OTHER PUBLICATIONS

American Seal & Packing, Vee Packings, www.sealsales.com, 4 pages, © 2005.
CDI Seals, Composite Vee Rings, www.cdipolytek.com, 1 page (no date).
Dicktomatik O-Ring Handbook, Section Eight, Dichtomatic North America Product Offering, pp. 196-204 (no date).
EPM, Inc., Vee Packing Types, www.epm.com, 2 pages, 1996-2005.
Teng Seng Industries, One Stop Seal Center, Hydraulic Vee Packings, www.tengseng.com, 2 pages (no date).

* cited by examiner

*Primary Examiner*—Vishal Patel
(74) *Attorney, Agent, or Firm*—TraskBritt

(57) ABSTRACT

According to one embodiment, a composite seal may include a first, substantially annular seal element having an upper body portion, a neck portion, and an axial protrusion. The upper body portion includes opposing inclined surfaces extending toward the neck portion defining a first angle. The axial protrusion includes opposing inclined surfaces extending toward an axial end of the axial protrusion defining a second angle, wherein the first angle and the second angle are substantially similar. The composite seal may further include a second, substantially annular seal element having a mouth portion, a neck portion and a recess portion, wherein the axial protrusion is configured to be complementarily engaged with the recess portion in an interlocking manner.

13 Claims, 4 Drawing Sheets

COMPOSITE SEALS, SEAL STRUCTURES AND RELATED METHODS

BACKGROUND OF THE INVENTION

1. Field of the Invention

The present invention relates generally to seals and structures used to effect a fluid seal between multiple mechanical or structural elements and, more particularly, to composite seals and structures used to effect fluid seals between mechanical or structural elements which may be relatively movable with respect to one another wherein the seal is effective in both low and high pressure applications.

2. State of the Art

Seals are conventionally used to maintain a substance, such as a fluid or gas, located in one area or zone from escaping to another area or zone while allowing relative movement of two or more mechanical components with one of the mechanical components traversing through both areas or zones. Such seals may also be used in keeping contaminants, such as dirt, dust or other particulate-type materials, from entering into a specified area or zone. For example, it may be desirable to maintain a lubricant in a specified area or zone while keeping dust or other particulates from entering into the same zone and contaminating the lubricant.

As will be appreciated by those of ordinary skill in the art, the ability to maintain adequate lubrication between two relatively movable machine components, as well as the ability to limit contaminants from entering between the two relatively movable machine components, greatly enhances the working efficiency of the machine components and also greatly reduces wear of such components, thereby increasing the usable life thereof. Additionally, the ability to keep a fluid within a specified zone, sometimes while exhibiting elevated pressures relative to other areas adjacent the zone, may be essential to the proper operation of the machine, device or structure in which the seal is disposed.

One common example of mechanical components that move with respect to one another is a piston and bore (which may also be referred to as a rod and cylinder). For instance, a piston may have an outer surface that is complementary and generally coaxial with the inner surface of a bore in which the piston moves axially, with or without rotation. It is usually desirable that no fluid flow around the piston, so that pressure within the bore may cause the piston to move. Moreover it is also preferred that the piston remain relatively centered within the bore, to prevent the surfaces of the piston and the bore from contacting one another.

Seals take various forms and are made of numerous types of materials depending on their intended service and anticipated working environment. O-rings are an example of a simple type of seal. Another type of seal conventionally used in conjunction with two or more relatively moving machine components are lip seals. Generally, lip seals exhibit a more complex cross-sectional geometry than o-rings and are correspondingly more complex to manufacture. O-rings and lip seals are relatively simple in their installation and operation as will be appreciated by those of ordinary skill in the art.

Another type of available seal may be referred to as a composite seal. Examples of composite seals are described in U.S. Pat. No. 3,848,880, issued to Tanner, and U.S. Pat. No. 4,635,945, issued to Beck, the disclosures of each of which patents are incorporated by reference herein in their entireties. Generally, composite seals include two or more seal elements or components that cooperatively and interdependently define and maintain the separation of multiple zones or areas such as discussed hereinabove. The two different seal elements may include two substantially annular, or ring-like, members formed of different materials so as to take advantage of the different sealing or other structural characteristics offered by such different materials. For example, one of the seal elements may be formed of a first specified material and configured to provide an efficient seal at relatively low pressures while another of the seal elements may be configured of a substantially different material and configured to provide an efficient seal when subject to elevated pressures.

Sometimes composite seals may be configured such that a portion of one seal element cooperatively engages and interlocks with a portion of another seal element such as described with the aforementioned Tanner and Beck patents. However, such cooperative and interlocking structures are often difficult to properly assemble. Moreover, composite seals will oftentimes become separated during installation between, for example, two relatively movable machine elements requiring removal and reassembly of the seal elements.

For example, referring to FIG. 1, a cross section of a composite seal 10 is shown that is generally similar to that described by the Beck patent. The seal 10 includes a first seal element 12 and a second seal element 14. The second seal element 14 exhibits a cross-sectional geometry that defines a throat 16 and a recess 18 that is radially enlarged relative to the throat 16. The first seal element 12 includes a protrusion 20 that exhibits a cross-sectional geometry that is complementary to the recess 18 of the second seal element 14. Adjacent the throat 16 is a pair of angled surfaces 22 which define an angle $\theta 1$ that is approximately 60° as such angled surfaces 22 extend toward the throat 16. On the opposite side of the throat 16 is a pair of angled surfaces 24 which define an angle $\theta 2$ that is approximately 40° as the angled surfaces 24 extend away from the throat 16. The first seal element 12 includes surfaces that complementarily mate with the angled surfaces 22 and 24 of the second seal element 14.

While the geometric configuration of the seal 10 may provide a relatively effective interlock between the first seal element 12 and the second seal element 14 (i.e., by way of the enlarged recess 18 as compared to the throat 16 and the cooperatively mating protrusion 20), the same configuration has made it difficult to assemble (or reassemble) the first and second seal elements 12 and 14. For example, the radially enlarged portions of the protrusion 20 (i.e., the portion configured to matingly engage the recess 18) may not become entirely inserted or installed within the recess 18 as intended. Rather, one of the radially extending edges of the protrusion 20 may get caught on an edge of the throat 16 and not become entirely disposed within the recess 18. In another example, air may become trapped between the protrusion 20 and the recess 18 such that the first seal element 12 is not entirely seated within second seal element 14 as intended. The partial seating of one component relative to the other can have a deleterious effect on the performance of the composite seal 10.

It is, therefore, desirable to provide a composite seal which provides effective sealing between multiple machine elements under varying conditions which is also simple to manufacture, assemble and install.

BRIEF SUMMARY OF THE INVENTION

In accordance with one aspect of the present invention, a composite seal is provided. The composite seal includes a first, substantially annular seal element having an upper body portion, a neck portion, and an axial protrusion. The upper body portion includes opposing inclined surfaces extending toward the neck portion defining a first angle. The axial protrusion includes opposing inclined surfaces extending toward an axial end of the axial protrusion defining a second angle, wherein the first angle and the second angle are substantially similar. The composite seal further includes a second, substantially annular seal element having a mouth portion, a neck portion and a recess portion, wherein the axial protrusion is configured to be complementarily engaged with the recess portion in an interlocking manner.

In accordance with another aspect of the present invention, a method of forming a seal is provided. The method includes forming a first, substantially annular seal element including defining an upper body portion, a neck portion and an axial protrusion. Opposing inclined surfaces are formed on the upper body portion to extend toward the neck portion and define a first angle. Opposing inclined surfaces are also formed on the axial protrusion that extend toward an axial end of the axial protrusion and define a second angle that is substantially equal to the first angle. A second, substantially annular seal element is also formed to include a mouth portion, a neck portion and a recess portion. The axial protrusion of the first seal element is disposed in the recess portion of the second seal element in an interlocking manner to form the composite seal.

In accordance with yet another aspect of the present invention, a seal structure is provided. The seal structure includes a first machine element and a second machine element, wherein the first machine element and second machine element are configured to accommodate relative movement of one with respect to the other. A substantially annular cavity formed in the first machine element and a composite seal is disposed in the substantially annular cavity. The composite seal includes a first, substantially annular seal element having an upper body portion, a neck portion, and an axial protrusion. The upper body portion includes opposing inclined surfaces extending toward the neck portion defining a first angle. The axial protrusion includes opposing inclined surfaces extending toward an axial end of the axial protrusion defining a second angle, wherein the first angle and the second angle are substantially similar. The composite seal further includes a second, substantially annular seal element having a mouth portion, a neck portion and a recess portion, wherein the axial protrusion is configured to be complementarily engaged with the recess portion in an interlocking manner.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
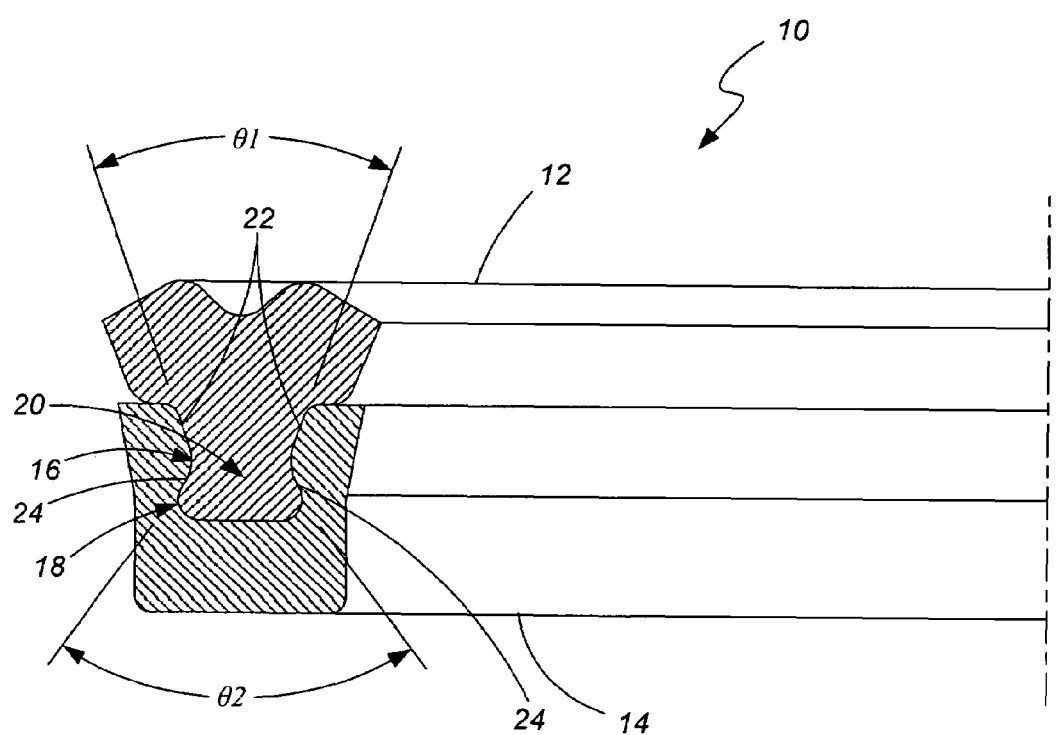
FIG. 1 is a partial cross-sectional view of a prior art composite seal.
Figure 2:
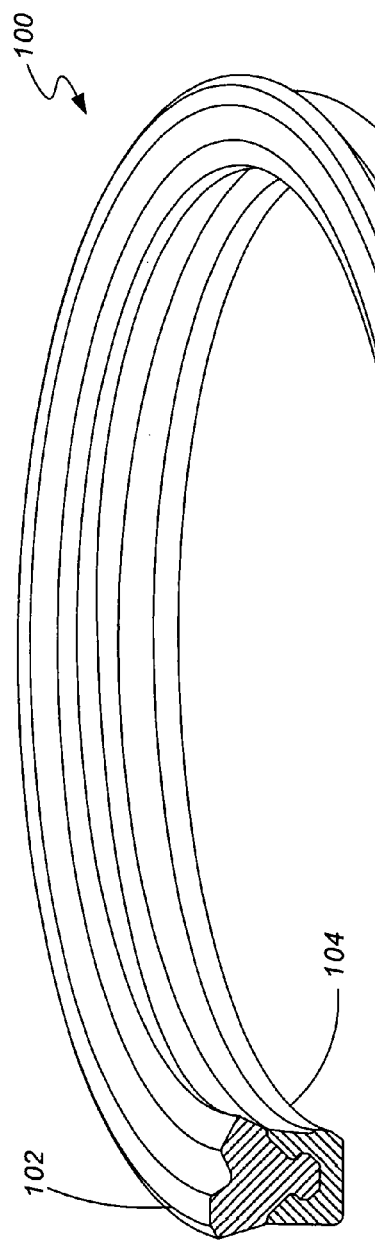
FIG. 2 is a sectional perspective view of a composite seal in accordance with an embodiment of the present invention.
Figure 3:
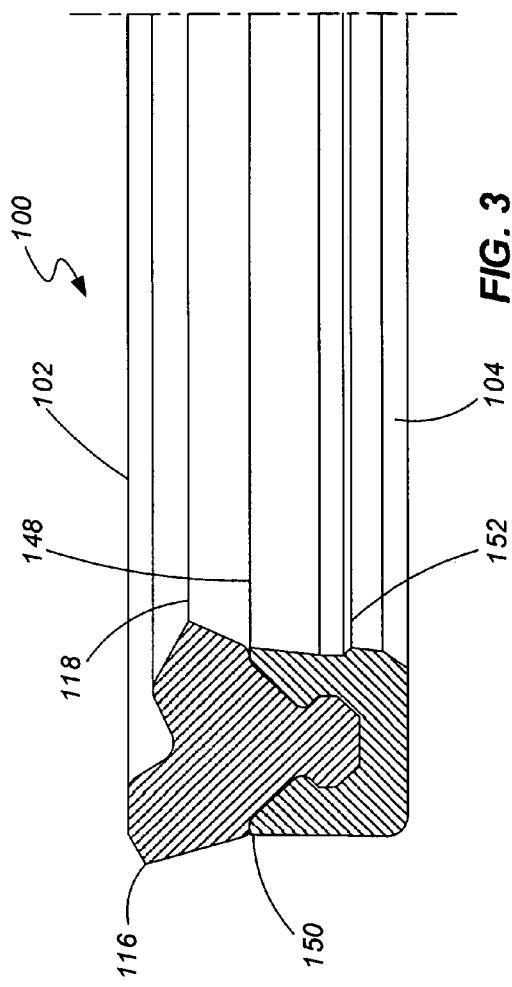
FIG. 3 is an enlarged cross-sectional view of a portion of the composite seal shown in FIG. 2.

FIGS. 2 and 3 depict a composite seal 100 in accordance with an embodiment of the present invention. FIG. 2 shows a perspective view of the seal 100 with a section removed to show cross-sectional details of various seal components. FIG. 3 shows an enlarged cross-sectional view of the seal components shown in FIG. 2. The seal 100 is formed as a generally ring-like, or annular, structure and, in the embodiment described with respect to FIGS. 2 and 3, is a continuous structure. In other embodiments, the seal may include a split structure wherein two matching ends meet, for example, at an angled or a stepped interface as will be appreciated by those of ordinary skill in the art.

The seal 100 includes a first seal element 102 and a second seal element 104. The first seal element 102 matingly engages the second seal element 104 such that the two seal elements 102 and 104 are effectively interlocked with one another and may generally function as a single unit when installed in a machine or structure as shall be described in a greater detail below. In one embodiment, the first seal element 102 may be formed of a relatively softer material than that of the second seal element 104. For example, the first seal element 102 may be formed of a material such as synthetic rubber or other synthetic elastomers including thermoset or thermoplastic materials, while the second seal element 104 may be formed of a material such as relatively harder elastomers or rubber, or plastics such as polyurethanes and polyamids. Of course, various other embodiments may incorporate different materials depending, for example, on the intended applications and environments in which the seal 100 is expected to be utilized.

Figure 4A:
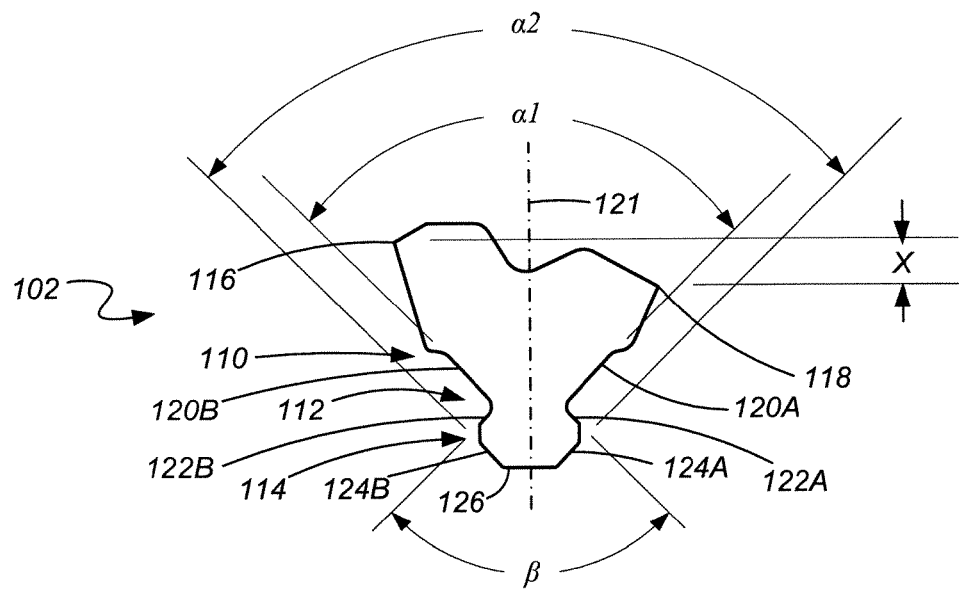
FIGS. 4A and 4B show the cross-sectional profiles of seal elements of the composite seal shown in FIG. 2.
Figure 4B:
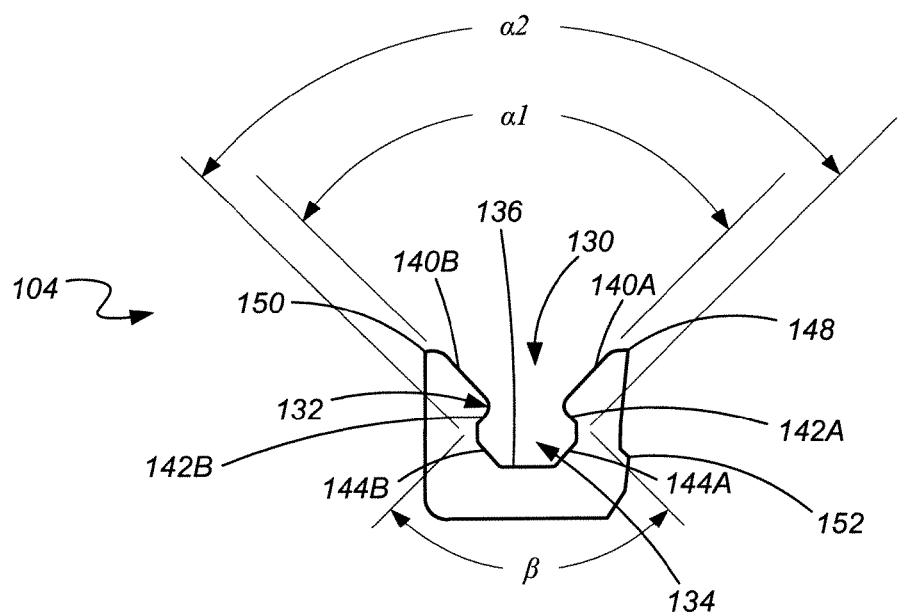

As noted hereinabove, the seal elements 102 and 104 work together to cooperatively define the seal 100. However, each seal element 102 and 104 includes features that help to enable their complementary and cooperative nature. FIGS. 4A and 4B depict cross-sectional profiles of the first seal element 102 and second seal element 104, respectively, in unassembled condition to better describe some of the features associated with such seal elements 102 and 104. Referring first to FIG. 4A in conjunction with FIGS. 2 and 3, the first seal element 102 includes an upper body portion 110, an area of reduced cross-sectional width referred to as a neck portion 112, and a lower body portion or what may be termed an axial protrusion 114. The upper body portion 110 includes a radially outer lip 116 and a radially inner lip 118. The radially outer lip 116 is disposed a distance from the radially inner lip 118 an axial distance "X." The axial distance X between the two lips 116 and 118 helps to provide stability to the seal 100 when installed in an intended environment, as will become more apparent upon further reading of the description.

The upper body portion 110 includes two opposing inclined frustoconinal surfaces, a radially inner surface 120A and a radially outer surface 120B, which extend to and are contiguous with the neck portion 112. The two opposing inclined surfaces, the radially inner surface 120A and the radially outer surface 120B, of the upper body portion 110 define an angle $\alpha 1$ therebetween. In one embodiment, the angle $\alpha 1$ may be approximately 60° or greater. In one particular embodiment, the angle $\alpha 1$ may be approximately 85°. Additionally, in one embodiment, the angle $\alpha 1$ may be congruent about an axis 121 extending in the axial direction.

The axial protrusion 114 includes two opposing inclined frustoconical surfaces, a radially inner surface 122A and a radially outer surface 122B, that are contiguous with the neck portion 112 and extend away from the neck portion 112 and which define an angle β. In one embodiment the angle β may be approximately 90° or greater. In one particular embodiment, the angle β may be approximately 98°. As with angle α1, angle β may be congruent about the axial axis 121.

The axial protrusion 114 further includes two opposing inclined frustoconical surfaces, a radially inner surface 124A and a radially outer surface 124B, which extend to and are contiguous with a generally flat bottom 126 of the axial protrusion 114. The two opposing inclined surfaces, the radially inner surface 124A and the radially outer surface 124B, define an angle α2 therebetween that is substantially similar to angle α1. In other words, radially inner surface 120A is substantially parallel with the radially inner surface 124A and radially outer surface 120B is substantially parallel with radially outer surface 124B.

Referring now to FIG. 4B in conjunction with FIGS. 2 and 3, the second seal element 104 includes what may be termed a mouth portion 130, an opening of reduced cross-sectional width which may be referred to as a throat portion 132 and a recess 134 exhibiting a cross-sectional width that is greater than that of the throat portion 132. The second seal element 104 includes two opposing inclined surfaces, including a radially inner surface 140A and a radially outer surface 140B, which extend from the mouth portion 130 to the throat portion 132 and define an angle α1. In other words, the radially inner and outer surfaces 140A and 140B define an angle similar to that defined by radially inner and outer surfaces 120A and 120B of the first seal element 102 so as to provide a complementary fit between the two seal elements 102 and 104 at such locations (see FIGS. 2 and 3).

Opposing inclined surfaces, including radially inner surface 142A and radially outer surface 142B, extend from the throat portion 132 into the recess 134 and define an angle β that is substantially similar to the angle β defined by radially inner and outer surfaces 122A and 122B of the first seal element 102. Additionally, opposing inclined surfaces, including radially inner surfaces 144A and 144B, extend within the recess 134 toward a flat bottom 136 thereof and define an angle α2 which is substantially similar to the angle β defined by radially inner and outer surfaces 124A and 124B of the first seal element 102.

The second seal element 104 also includes a radially inner lip 148 and a radially outer lip 150 at the axially end which engages with the first seal element 102. An additional protrusion 152 may be formed to extend radially inwardly from the inwardly most radial surfaces of the second seal element 104.

Referring to FIGS. 2, 3, 4A and 4B, the first and second seal elements 102 and 104 cooperatively engage one another to define the composite seal 100. The angle α1 defined between the surfaces 140A and 140B extending from the mouth portion 130 to the throat portion 132, being approximately 60° or greater, improves ease of assembly of the first seal element 102 with the second seal element 104 enabling the protrusion 114 to more easily align with the throat portion 132. Moreover, the angle α2 being substantially similar to the angle α1 enables the opposing surfaces 124A and 124B of the first seal element 102 to engage and align with the opposing surfaces 140A and 140B of the second seal element 104 during assembly prior to the axial protrusion 114 being disposed through the throat portion 132 of the second seal element 104 and into the recess 134. Once the axial protrusion 114 is disposed within the recess 134 of the second seal element 104, an interference occurs between the radially extending portions of the axial protrusion 114 and the throat portion 132 of the second seal element 104 to effect the interlock between the first and second seal elements 102 and 104. The angle β being approximately 90° or greater provides an effective interlock between the first and second seal elements 102 and 104 and reduces the possibility of the two seal elements 102 and 104 from inadvertently separating during installation of the seal 100 in a machine element.

In the embodiment shown and described with respect to FIGS. 2, 3, 4A and 4B, and when assembled as a seal 100, the opposing surfaces 120A and 120B of the first seal element 102 engage with the opposing surfaces 140A and 140B of the second seal element 104 over an axial distance which is approximately one third (i.e., the upper one third as shown in FIGS. 2 and 3) of the overall axial length of the second seal element 104. Additionally, the axial protrusion 114 of the first seal element 102 engages with the recess 134 of the second seal element 104 over an axial distance of approximately one third (i.e., the middle one third as shown in FIGS. 2 and 3) of the overall axial length of the second seal element 104. These relationships again help to enable simple and effective assembly of the first and second seal elements 102 and 104, while also providing a stable and effective resulting seal 100.

Figure 5:
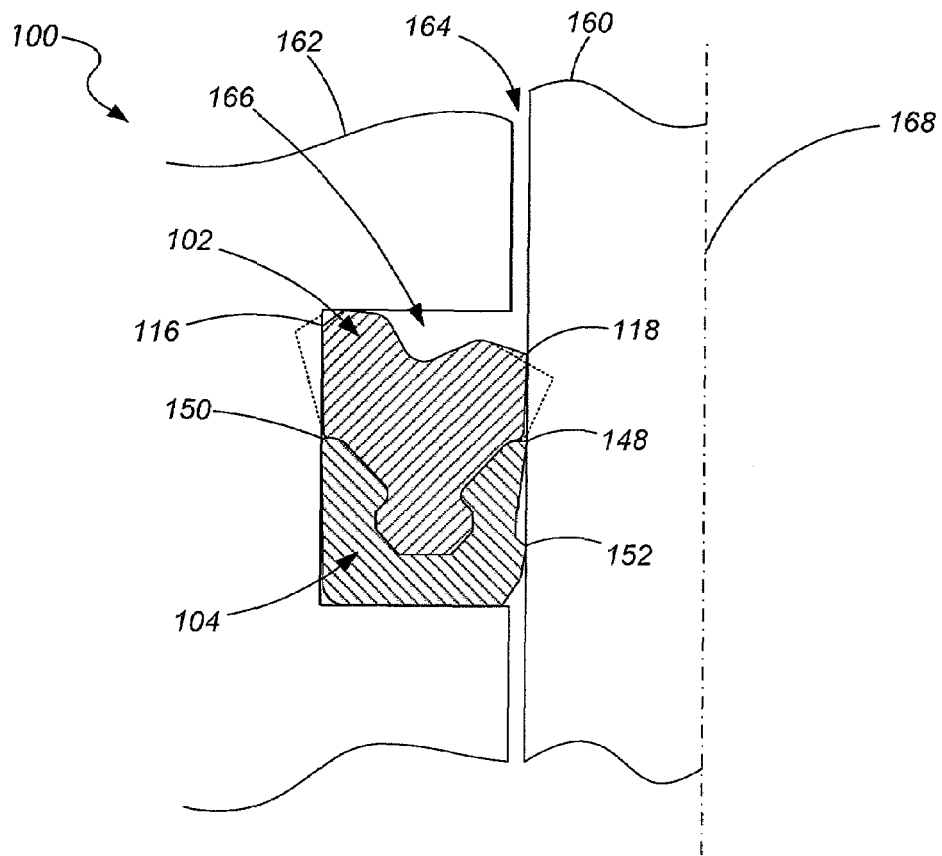
FIG. 5 is a cross-sectional view of a composite seal installed in a device or structure having relatively movable machine elements in accordance with an aspect of the present invention.

Referring now to FIG. 5, a cross-sectional view is shown of a seal 100 installed In a machine environment. The machine environment may include a first machine element such as, for example, a piston or a rod 160 and a second machine element such as, for example, a bore or a cylinder 162. The rod 160 is disposed within the cylinder 162 such that a substantially annular space 164 is defined therebetween. A substantially annular cavity 166 may be defined within the cylinder 162 and the seal 100 disposed within the cavity 166. In another embodiment, the annular cavity 166 may be formed in the rod 160 as will be appreciated by those of ordinary skill in the art. In operation, the rod 160 may rotate relative to the cylinder 162, and may be axially displaced along longitudinal axis 168 relative to the cylinder 162, or both.

The radially outer lip 116 of the first seal element 102 contacts a wall of the cavity 166 forming a fluid seal therewith and the radially inner lip 118 of the first seal element 102 contacts a surface of the rod 160 forming a fluid seal therewith. The lips 116 and 118 of the first seal element 102 may be displaced radially toward one another (as indicated by dashed lines) such that the first seal element 102, or at least a portion thereof, is generally placed in radial compression. Similarly, the radially outer lip 150 of the second seal element 104 may contact the wall of the cavity 166 and the radially inner lip 148 of the second seal element 104 may contact the surface of the rod 160 to provide additional fluid seals. The radial protrusion 152 may also contact the surface of the rod 160 to provide an additional fluid seal, to provide stability of the seal 100 in its installed configuration, or to act as both a fluid seal and a stabilizing structure.

Figure 6:
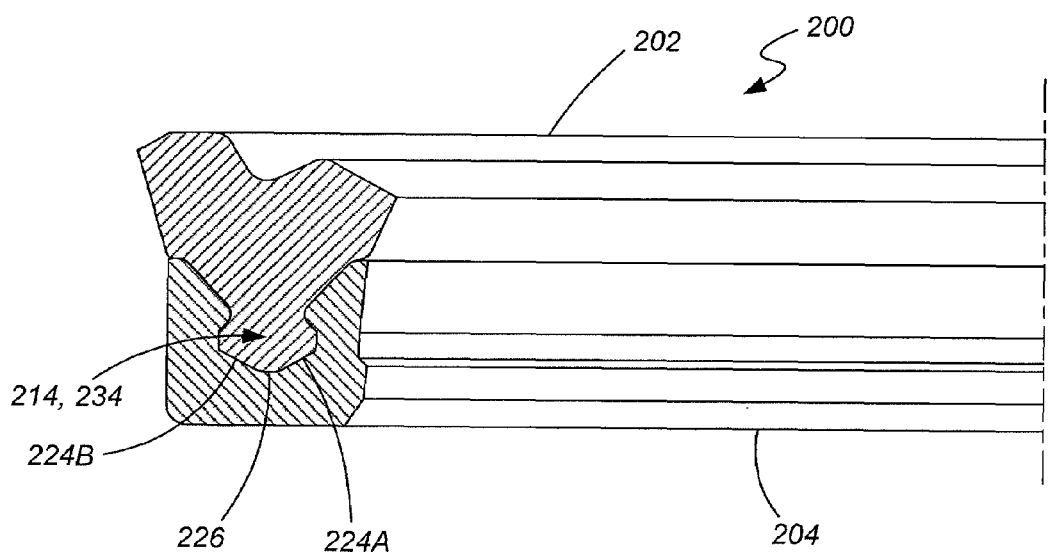
FIG. 6 is a partial cross-sectional view of a composite seal in accordance with another embodiment of the present invention.

Referring now to FIG. 6, a seal 200 in accordance with another embodiment of the present invention is shown. The seal 200 includes a first seal element 202 and a second seal element 204 which are configured substantially similar to the first and second seal elements 102 and 104 of the seal 100 shown and described with respect to FIGS. 2 and 3. However, the axial protrusion 214 of the first seal element 202 (and the corresponding recess 234 of the second seal element 204) does not exhibit a substantially flat bottom but, rather, exhibits a substantially arcuate peak 226 that transitions between opposing inclined surfaces 224A and 224B.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A composite seal comprising:
a substantially annular first seal element comprising an upper body portion, an axial protrusion, and a neck portion located between the upper body portion and the axial protrusion, wherein:
the upper body portion includes a radially outer lip, a radially inner lip, and first opposing inclined frustoconical surfaces extending to and contiguous with the neck portion, the first opposing inclined frustoconical surfaces defining a first angle therebetween;
the axial protrusion includes second opposing inclined frustoconical surfaces extending to and contiguous with an axial end of the axial protrusion, the second opposing inclined frustoconical surfaces defining a second angle therebetween, and third opposing inclined frustoconical surfaces that are contiguous with the neck portion and extend away from the neck portion, the third opposing inclined frustoconical surfaces defining a third angle therebetween;
the first angle and the second angle are substantially similar and 60° or greater; and
the third angle is 90° or greater; and
a substantially annular second seal element having a mouth portion, a throat portion and a recess portion, and wherein;
the axial protrusion of the substantially annular first seal element is complementarily engaged with the recess portion of the substantially annular second seal element in an interlocking manner;
the neck portion of the substantially annular first seal element complementarily abuts walls of the throat portion of the substantially annular second seal element; and
the first opposing inclined frustoconical surfaces of the substantially annular first seal element complementarily abut walls of the mouth portion of the substantially annular second seal element.

2. The composite seal of claim 1, wherein the first angle is approximately 85° and wherein the third angle is approximately 98°.

3. The composite seal of claim 1, wherein the radially outer lip is disposed at an axial distance from the radially inner lip.

4. The composite seal of claim 3, wherein the substantially annular second seal element includes a radially inner lip, a radially outer lip and a radially projecting protrusion.

5. The composite seal of claim 4, wherein the axial end of the axial protrusion includes a substantially flat bottom.

6. The composite seal of claim 5, wherein the substantially annular first seal element is formed of a first material, and wherein the substantially annular second seal element is formed as a second material that is relatively harder than the first material.

7. A method of forming a seal, the method comprising:
forming a substantially annular first seal element including
defining an upper body portion,
an axial protrusion, and a neck portion between the upper body portion and the axial protrusion, including:
forming the upper body portion with a radially outer lip, a radially inner lip, and first opposing inclined frustoconical surfaces that extend to and are contiguous with the neck portion; and
forming the first opposing inclined frustoconical surfaces to define a first angle therebetween that is 60° or greater;
forming the axial protrusion comprising:
forming second opposing inclined frustoconical surfaces that extend to and are contiguous with an axial end of the axial protrusion;
forming the second opposing inclined frustoconical surfaces to define a second angle therebetween that is 60° or greater and substantially similar to the first angle;
forming third opposing inclined frustoconical surfaces that are contiguous the neck portion and extend away from the neck portion; and
forming the third opposing inclined frustoconical surfaces to define a third angle therebetween that is 90° or greater;
forming a substantially annular second seal element having a mouth portion, a throat portion and a recess portion; and
disposing the axial protrusion in the recess portion in an interlocking manner;
disposing the neck portion of the substantially annular first seal element in the throat portion of the substantially annular second seal element so that the neck portion complementarily abuts walls of the throat portion; and
disposing the first opposing inclined frustoconical surfaces of the substantially annular first seal element in the mouth portion of the substantially annular second seal element so that the first opposing inclined frustoconical surfaces complementarily abut walls of the mouth portion.

8. The method of claim 7, further comprising forming the first opposing inclined frustoconical surfaces to define the first angle therebetween to be approximately 85° and forming the third opposing inclined frustoconical surfaces to define the third angle therebetween to be approximately 98°.

9. The method of claim 7, further comprising forming the radially outer lip to be at an axially spaced distance from the radially inner lip.

10. The method of claim 9, further comprising forming a radially inner lip, a radially outer lip and a radial projection on the substantially annular second seal element.

11. The method of claim 10, further comprising forming the axial end of the axial protrusion to include a substantially flat bottom.

12. The method of claim 11, further comprising forming the substantially annular first seal element of a first material and forming the substantially annular second seal element of a second, relatively harder material.

13. A seal structure comprising:
a first machine element;
a second machine element, the first machine element and second machine element being configured to accommodate relative movement with respect to each other;
a substantially annular cavity formed in the first machine element;
a composite seal disposed in the substantially annular cavity, the composite seal comprising:
a substantially annular first seal element comprising an upper body portion, an axial protrusion, and a neck portion located between the upper body portion and the axial protrusion, wherein:
the upper body portion includes a radially outer lip, a radially inner lip, and first opposing inclined frustoconical surfaces extending to and contiguous with the neck portion, the first opposing inclined frustoconical surfaces defining a first angle therebetween;

the axial protrusion includes second opposing inclined frustoconical surfaces extending to and contiguous with an axial end of the axial protrusion, the second opposing inclined frustoconical surfaces defining a second angle therebetween, and third opposing inclined frustoconical surfaces that are contiguous with the neck portion and extend away from the neck portion, the third opposing inclined frustoconical surfaces defining a third angle therebetween;

the first angle and the second angle are substantially similar and 60° or greater; and the third angle is 90° or greater; and a substantially annular second seal element having a mouth portion, a throat portion and a recess portion, and wherein:

the axial protrusion of the substantially annular first seal element is complementarily engaged with the recess portion of the substantially annular second seal element in an interlocking manner;

the neck portion of the substantially annular first seal element complementarily abuts walls of the throat portion of the substantially annular second seal element; and the first opposing inclined frustoconical surfaces of the substantially annular first seal element complementarily abut walls of the mouth portion of the substantially annular second seal element.

* * * * *